Jan. 31, 1961
H. D. PETRI ET AL
2,969,570
LOCKING FASTENER
Filed Sept. 18, 1958
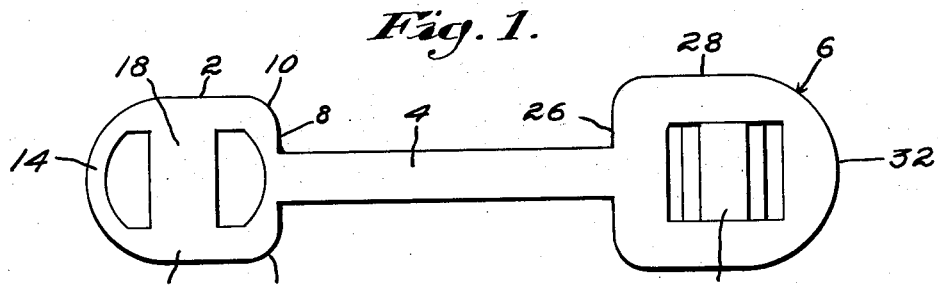
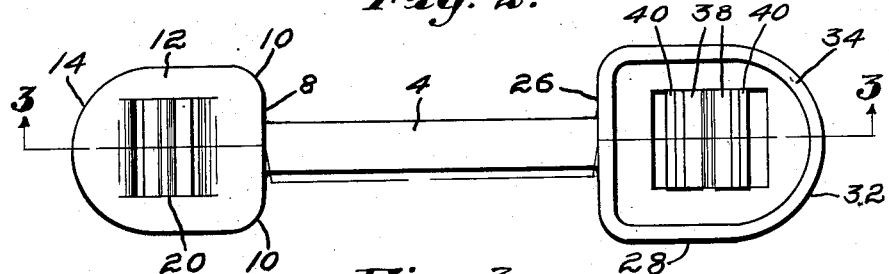
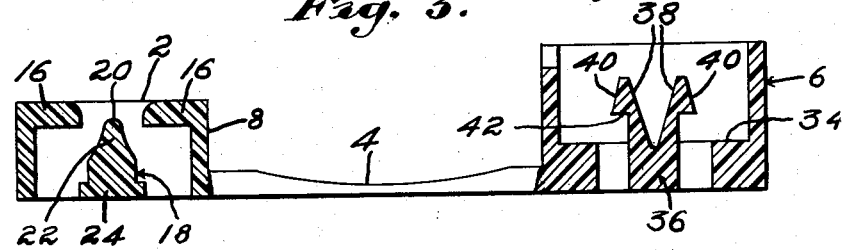
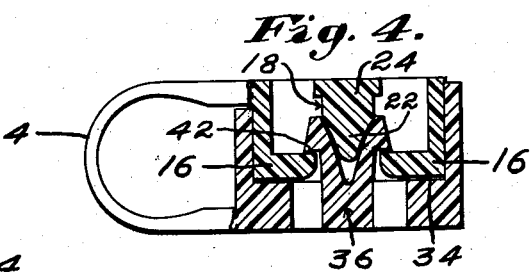
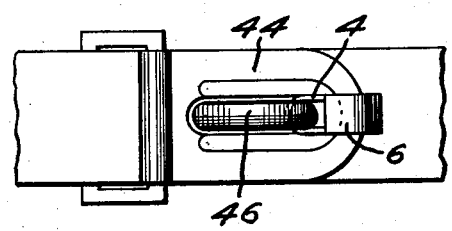
Inventor:
Hector D. Petri
Carl J. Symonds,
by Walter J. Jones
Att'y.

United States Patent Office 2,969,570
Patented Jan. 31, 1961

2,696,570
LOCKING FASTENER

Hector D. Petri, Framingham, and Carl J. Symonds, Arlington, Mass., assignors to United-Carr Fastener Corporation, Cambridge, Mass., a corporation of Delaware Filed Sept. 18, 1958, Ser. No. 761,893

1 Claim. (Cl. 24—16)

This invention relates to locking fasteners for use with various articles which must be locked where it is desired to guard against undetected opening of the article.

It is an object of the invention to provide an improved locking fastener which may be cheaply manufactured and which cannot be removed without detection.

A further object of the invention is to provide a locking fastener which cannot be opened without breaking some part of it once it has been locked.

Other objects of the invention will, in part, be obvious, and will, in part, appear hereinafter.

In the drawing:

Fig. 1 is a bottom plan view of a preferred embodiment of applicant's invention;

Fig. 2 is a top plan view of the fastener shown in Fig. 1;

Fig. 3 is a section taken on line 3—3 of Fig. 2;

Fig. 4 is a section the same as Fig. 3 showing the fastener engaged; and

Fig. 5 is a view of the application of the fastener to a hasp and staple.

In the construction illustrated, the fastener comprises a female element 2, a flat flexible connecting strip 4 and a male element 6. The female element 2 comprises a female base portion 8 having a substantially straight outside surface and a concave inside surface. The reason for the concavity of the inside surface will be shown hereinafter. Integral with and at right angles to the base 8 at its terminal ends 10 are two female straight portions 12 which in turn are integral with a female bight portion 14. The outer surfaces of the said female base 8, straight portions 12—12 and bight 14 portions form an arch as shown in Fig. 2. Extending away from the female base portion 8 and the female bight portion 14 toward each other are shoulder portions 16 located at what may be considered the top of the female element 2. Approximately midway between the female base 8 and the female bight 14 is a triangular shaped bar portion 18 connecting the straight portions 12. The shoulders 16 extend only a short distance into the area formed by the said arch, leaving an aperture over the apex 20 and both sides of the triangular bar portion 18. The apex 20 of the bar portion 18 lies between the shoulder portions 16. The triangular bar portion 18 may consist, as in the illustrated embodiment, of a slightly rounded apex 20, a triangle portion 22 whose sides are at a predetermined point straightened to form a right angle with the stand 24 of the bar portion 18 as shown in Fig. 3. The stand 24 may be extended slightly beyond the triangle portion 22 to form a slight shelf. The sides of the triangular portion 22 may be formed slightly concave which allows the part to lead into its area of engagement easier and to engage the male element more efficiently.

The male element 6 comprises a male base portion 26, integral with and at right angles to the said male base 26 are two male straight portions 28 which are in spaced parallel relationship. The two male straight portions 28 are connected at their terminal ends 30 by a male bight portion 32. The male base straight and bight portions, numbers 28, 30 and 32 respectively, together form an arch as illustrated in Fig. 3. On the side of the male element 6 where the male element 6 is integral with the connecting strip 4, a comparatively thin male shoulder 34 is formed integral with all sides of the male arch. A rectangular bar 36 connects the two portions of the shoulder 34 integral with the male straight portions 28 at the approximate midpoint of the male straight portions 28. Integral with the rectangular bar 36 in angular relationship thereto and to each other, are two post portions 38 extending into the area formed by the said arch. The heads 40 of the post portions 38 are triangular in form and containing a locking shoulder 42 at approximate right angle relationship with the post portion 38. The general appearance of the heads 40 is that of a bisected triangle. The apex of the heads 40 face away from the male shoulder 34.

To engage the male element 6 with the female element 2, the heads 40 of the posts 38 are placed on opposite sides of the apex 20 of the triangular bar portion 18. The angle of the apex 20 is greater than the angle formed by the posts 38 which forces the posts 38 further apart as horizontal force is applied. At a predetermined point the locking shoulder 42 of the parts 38 will lock with the shoulder portions 16 of the female element as shown in Fig. 4. The connecting strip 4 has, during this time, been bent into a loop as illustrated in Fig. 4. To engage the fastener, a loop 44 and staple 46, the staple is passed through the loop and the connecting strip 4 of the fastener is passed around one arm of the staple and the male element 6 and the female element 2 are engaged as set forth above. Obviously it is necessary that the arch formed by the male element should be large enough to encompass the arch formed by the female element. In the preferred embodiment, a plastic material was used, however, certain metals, rubber and other like materials could be substituted for the plastic. When this fastener has been fully engaged, there is very little possibility of separating the elements or of opening the fastener without making a very easily detectable damage to the fastener.

Since certain other obvious modifications may be made in this device without departing from the scope of the invention, it is intended that all matter contained herein be interpreted in an illustrative and not in a limiting sense.

We claim:

A locking fastener comprising a flexible connecting strip, a female element integral with one terminal end of said strip and a male element integral with the other terminal end of said strip, said female element comprising a base portion, attached to said connecting strip, two straight portions integral with said base portion and in right angle relationship thereto, a bight portion in the form of a segment of a circle connecting the straight portions at their end farthest from the base portion, a triangular shaped bar portion connecting the two straight portions, and a pair of shoulder portions formed on the base and bight portions, said male element comprising a male wall portion formed to fit around the base portion, straight portions and bight portion of said female element, a shelf integral with said male wall portion which overlies a portion of said female element, a male connecting bar connecting said shelf and male shoulder elements in spaced acute angular relationship to each other for engagement with said female element.

References Cited in the file of this patent

UNITED STATES PATENTS

| | | |
|---|---|---|
| 684,497 | Davies | Oct. 15, 1901 |
| 779,660 | Munn | Jan. 10, 1905 |
| 1,237,201 | Green | Aug. 14, 1917 |
| 2,283,125 | Powell | May 12, 1942 |